United States Patent [19]

Rosenthal

[11] Patent Number: 4,480,706

[45] Date of Patent: Nov. 6, 1984

[54] AUTOMATICALLY DETERMINING THE TEST WEIGHT PER BUSHEL OF GRAIN

[75] Inventor: Robert D. Rosenthal, Gaithersburg, Md.

[73] Assignee: Trebor Industries, Inc., Gaithersburg, Md.

[21] Appl. No.: 428,817

[22] Filed: Sep. 30, 1982

[51] Int. Cl.³ ..................... G01G 19/52; G01G 23/00; G01G 13/00
[52] U.S. Cl. .................................... 177/50; 177/245; 177/67
[58] Field of Search ..................... 177/50, 59, 145, 67, 177/149, 245

[56] References Cited

U.S. PATENT DOCUMENTS

| | | | |
|---|---|---|---|
| 2,896,935 | 7/1959 | Osojnak et al. | 177/145 X |
| 4,096,918 | 6/1978 | Beggs et al. | 177/145 |
| 4,286,327 | 8/1981 | Rosenthal et al. | 364/498 |
| 4,431,071 | 2/1984 | Magat et al. | 177/149 |

OTHER PUBLICATIONS

U.S.D.A. Circular No. 921, dated Jun. 1953, entitled "The Test Weight Per Bushel of Grain: Methods and Use of Calibration of the Apparatus".

Primary Examiner—George H. Miller, Jr.
Attorney, Agent, or Firm—Bernard, Rothwell & Brown

[57] ABSTRACT

An apparatus for automatically determining the test weight per bushel of grain utilizes the principal components of the standard approved test, namely a stoppered bottom hopper, a measured quart kettle and a stroker. The operation of the stoppered bottom and the stroker is automatic by virtue on being mounted on a reciprocating slide. The test kettle is pivotally mounted for dumping by a drive motor, and the entire dumping drive motor arrangement and support is mounted on a load cell for weighing the measured grain in the test kettle. The operations are automatically controlled in sequence, first taring the load cell, then unstopping the hopper bottom, next stroking the test kettle, then reading the load cell and last dumping the test kettle to prepare for the next test weighing.

7 Claims, 8 Drawing Figures

AUTOMATICALLY DETERMINING THE TEST WEIGHT PER BUSHEL OF GRAIN

BACKGROUND OF THE INVENTION

1. Field of the Invention

This invention relates to an improved apparatus for measuring the test weight per bushel of grain and doing the same automatically.

2. Prior Art

The test weight per bushel for grain is an important factor in assigning a grade to a lot of grain under the official grain standards of the United States. It is therefore essential that the test weight per bushel be accurately measured as it affects the market value of the grain.

The known test weight per bushel tester designed by the U.S. Department of Agriculture is described in USDA Circular 921 of June 1953 which supersedes Bulletin 1065 issued May 1922. This standard weight per bushel testing apparatus consists of a stand, a filling hopper, a test kettle, a weighing beam, an overflow pan and a stroker as shown in FIG. 2 of USDA Circular 921. The standard weight-per-bushel tester is so designed that when the test kettle is properly filled and the surplus grain is struck off, it contains exactly one dry quart or 67.2 cubic inches of grain. When the filled test kettle is weighed the weight of the contents may be determined directly in pounds per bushel as there are 32 quarts to the bushel and the weighing beam indicates 32 times the actual contents of the test kettle.

The standard method of determining weight per bushel includes a series of steps which require some skill and faithful compliance. See page 4 of USDA Circular 921. This Circular also lists 10 variations or factors which will cause errors in the test weight per bushel even using the standard approved apparatus, see pages 4, 5.

Additionally, in addition to requiring at least semi-skilled operators, the USDA approved test is time consuming of personnel. However, the USDA method is accurate, is officially and governmentally accepted, and is almost universally used in the United States. Nonetheless there is a need to automate the method, to eliminate the need for semi-skilled or skilled workers and to speed up the measurement while eliminating the factors which can cause errors in test weight measurements.

SUMMARY OF THE INVENTION

This invention utilizes the same critical components as the standard USDA government approved test apparatus for determining test weight per bushel of grain namely a stoppered hopper and the standard test kettle (with their relations to one another), and a standard stroker. However, instead of requiring manual placement of the kettle on a beam balance, the present invention provides kettle support means with automatic weighing means and provides means for automating the operations of unstoppering the filling hopper, and stroking the test kettle after which the weighing means can be read to determine weight. Subsequently the test kettle may be automatically dumped and all components returned to the initial position for receiving another test batch.

Additionally, test weight measurement of grain is commonly accompanied by a separate measurement of moisture, protein or other constituents of the grain using near infrared testers such as the Trebor-90 now on the market, (see U.S. Pat. No. 4,286,327). This invention also may combine automatically feeding a portion of the grain sample from the hopper to an infrared tester at the same time the grain is fed to the test kettle from the hopper.

DESCRIPTION OF THE PREFERRED EMBODIMENT

Figure 1:
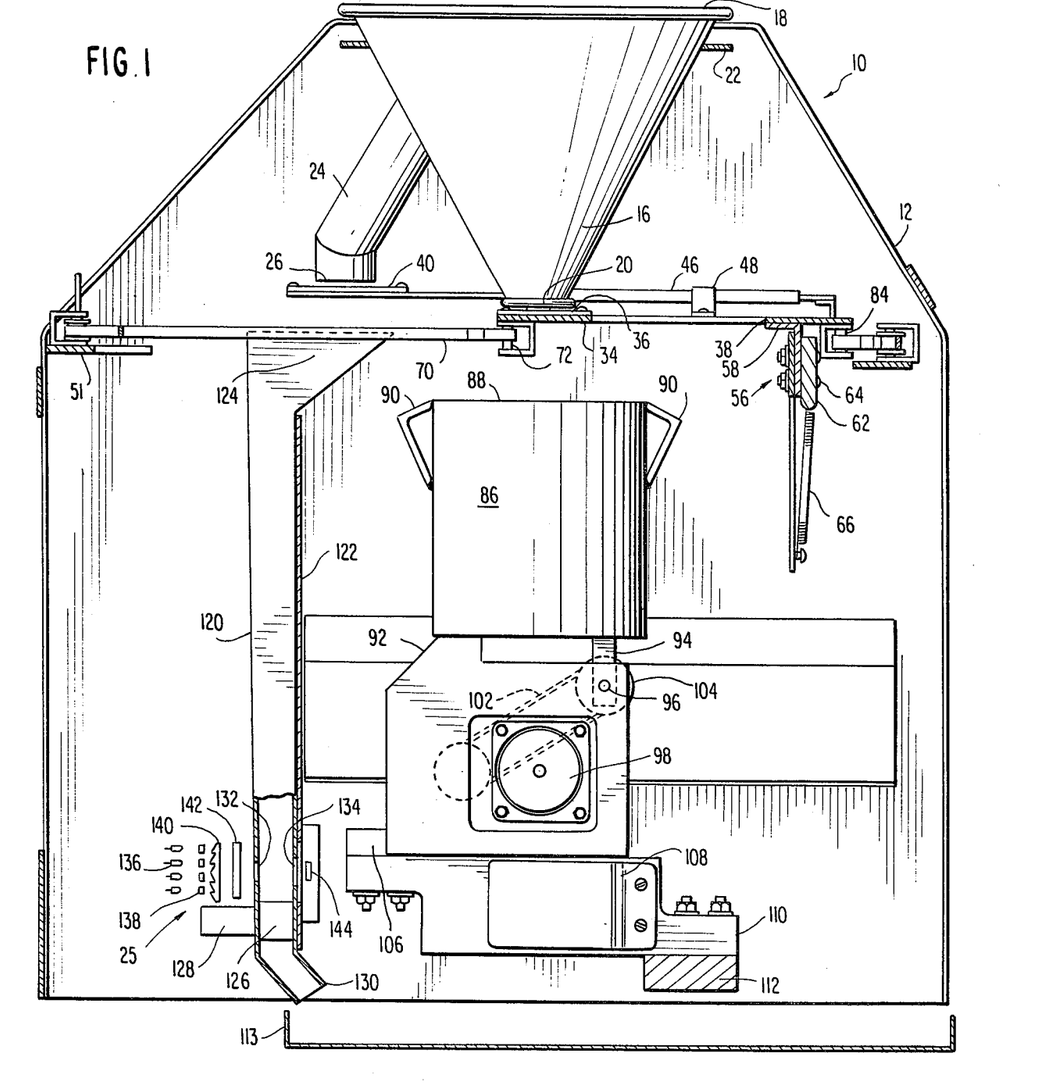
FIG. 1 is a side elevation view partially in section and with portions removed for the sake of clarity showing an apparatus in accordance with one embodiment of this invention.
Figure 3:
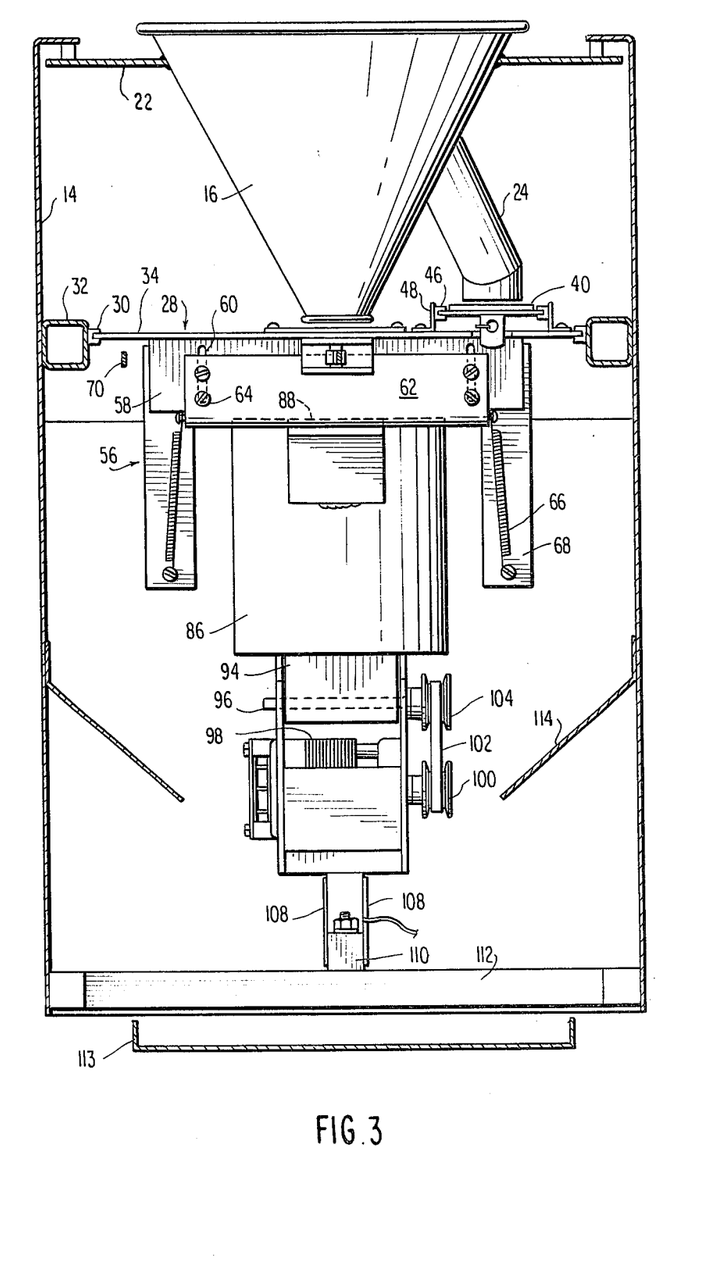
FIG. 3 is an end elevation view partially in section and with certain components removed for the sake of clarity of the apparatus of FIG. 1.

As shown in FIG. 1, a test weight per bushel of grain measuring instrument 10 includes a support and housing assembly 12 with side plates 14 (FIG. 3). At the top of the instrument is a hopper 16 which in shape and size is identical to the hopper described in USDA Circular 921 in that it can hold at least 1⅛ quarts of grain to cause overflowing of a one quart test kettle. The hopper has an open top 18 and a closable bottom 20 with an opening which is 1¼ inches in diameter. The hopper is supported rigidly within the apparatus from a hopper support plate 22 supported from the side plates 14, see FIG. 3. A grain conduit 24 for feeding grain to an infrared testing mechanism 25 has its upper end extending to and in communication with the upper portion of the hopper 16 and has a closeable bottom or lower end 26.

Figure 2:
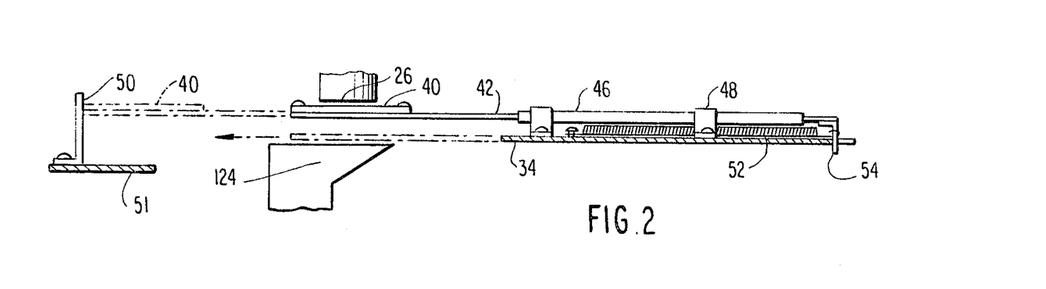
FIG. 2 is a detailed side elevation view partially in section of a slide mounted stoppering mechanism for controlling the flow of grain to an infrared testing mechanism in the apparatus of FIG. 1.

For controlling the outlet from the hopper and from the conduit 24 as well as controlling the stroking of a test kettle there is provided a reciprocal slide assembly 28, FIG. 3. This slide assembly slides in slide rails 30, which in turn are supported from support beams 32 attached to the side plates 14. The slide assembly 28 includes a slide plate 34 which has a hopper bottom closure pad 36 secured thereto, see FIGS. 1 and 4. To one side of the hopper bottom closure pad there is a feed slot or cutout 38 having a width wider than the diameter of the hopper bottom 20. Similarly, there is a conduit outlet closure pad 40 attached to an auxiliary slide 42. The auxiliary slide also has a feed slot or cutout 44 having a width greater than the conduit 24, see FIG. 4. The auxiliary slide slides on rails 46 supported by brackets 48 from the slide plate 34. A stop 50 supported on support shelf 51 functions as a stop for one end of the auxiliary slide during reciprocation of the slide assembly. With reference to FIG. 2, a spring 52 attached at one end to slide 34 and at another end to bracket 54 on slide 42 allows slide plate 42 to move to the left as shown in FIG. 2 after slide 42 abuts against stop 50 as shown in phantom lines in FIG. 2.

Figure 4:
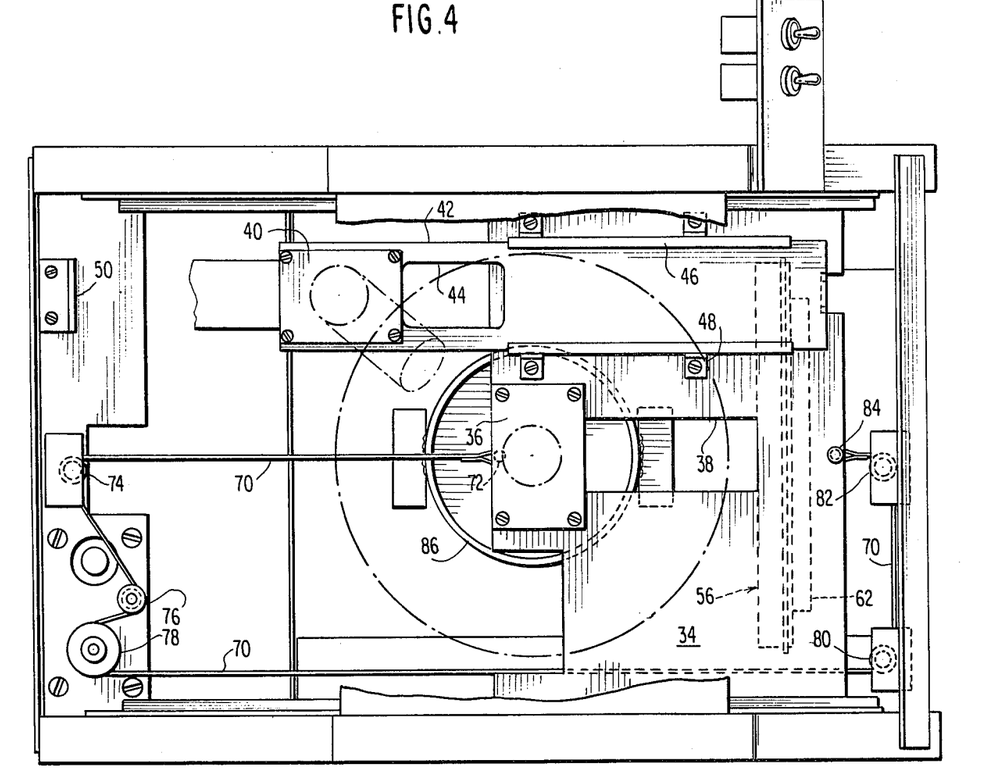
FIG. 4 is a top plan view with portions of the housing and other components removed for the sake of the clarity showing the components of the apparatus of FIG. 1 in one position for one stage of the operation.

A stroker assembly 56, FIGS. 1, 3 and 4, includes an L-shaped support bracket 58 secured to the bottom of slide plate 34 adjacent the feed slot 38. The support has vertical slots 60 therein, see FIG. 3, for mounting a stroker bar 62 for limited vertical movement. Nut and bolt assemblies 64 extending through the stroker bar and through the slots 60 loosely guide the stroker bar for this limited vertical movement. A spring 66 is attached at each end of the stroker bar shown in FIG. 3 and the other end of the spring is attached to a plate 68 extending downwardly from the bracket 58. With this arrangement the stroker bar 62, which is preferably the same material, same cross section, and same surface configuration as the stroker of the USDA Circular 921 (hardwood, ⅜ inch thick, 1¾ inches wide, with half round edges), is allowed limited vertical movement but is lightly biased by the spring 66 downwardly toward the top of the test kettle.

For driving the slide assembly 28 there is provided a drive tape 70, see FIG. 4. One end of the tape 70 is connected to a tape connection post 72 attached to the underside of slide plate 34 and trained over a pulley 74 at one end of the apparatus. The tape 70 is also trained over another pulley 76 and then around a drive capstan 78 driven by a motor 79, see FIG. 7. The drive tape 70 then extends over further pulleys 80 and 82 and the other end is secured to a connection post 84 also on the bottom of slide 34, see FIGS. 1 and 2.

Figure 6:
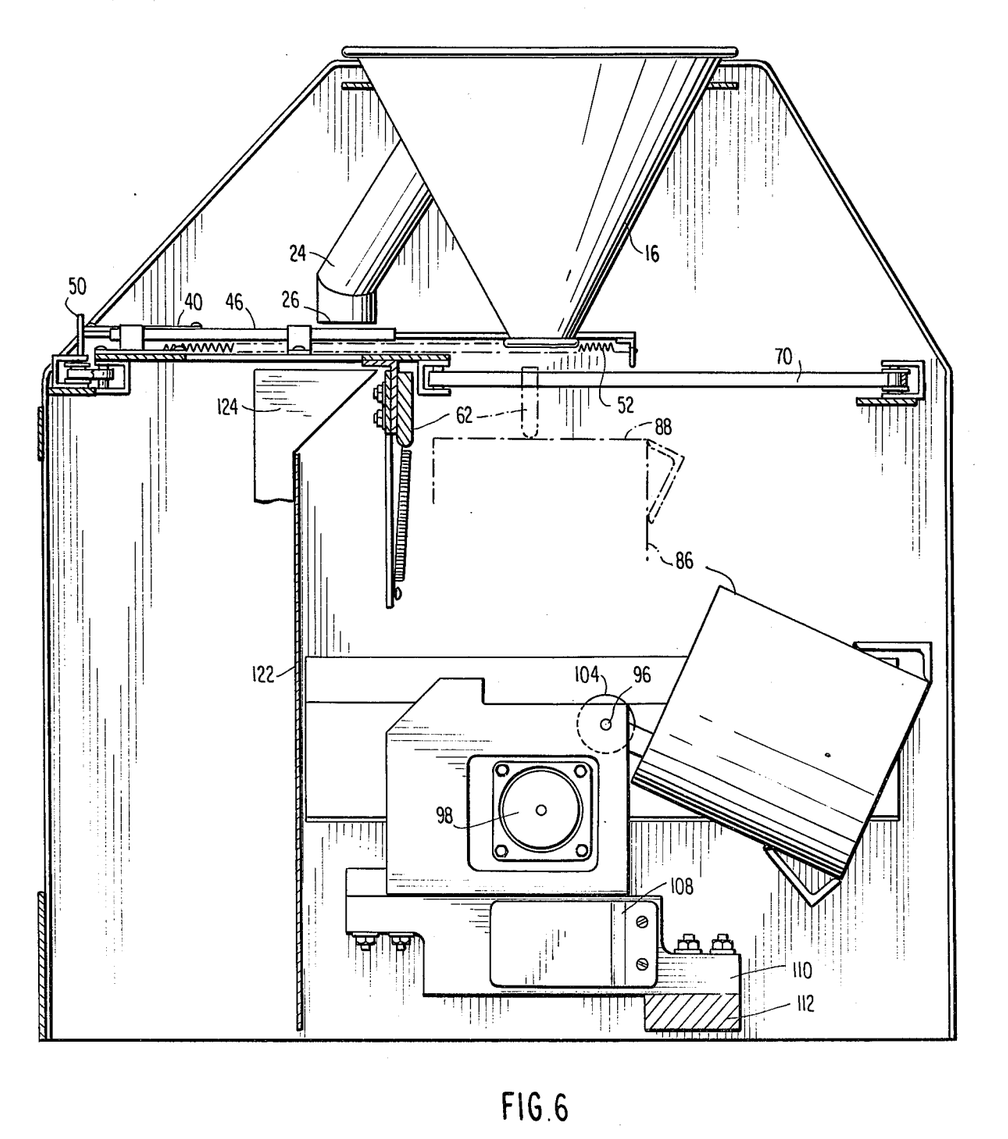
FIG. 6 is a side elevation view similar to FIG. 1 with certain components removed showing the components in another position with the test kettle in the dump mode.

A test kettle 86 is preferably identical in size, shape and position with regard to the hopper as the test kettle of USDA Circular 921. That is, it is a quart kettle having a capacity of exactly 67.2 cubic inches with an inside height of 4 inches. The top of the kettle is exactly 2 inches below the bottom of the opening 20 in the hopper 16. The kettle has an open smooth top 88 for receiving the grain from the hopper 16. It also has a pair of ramps 90 attached to opposite sides thereof for guiding the stroker bar 62 for its movement across the top of the kettle for stroking off excess grain. The kettle 86 rests on a support 92 and has a depending leg 94 which is rigidly attached to a pivot axle 96. A drive motor 98, see FIG. 3, drives a pulley 100 which is connected via belt 102 to pulley 104 rigidly attached to the pivot axle 96. Thus rotation of the motor will cause the belt 102 to drive the pulley 104 tilting the kettle 86 about axle 96 as shown in FIG. 6.

The motor 98 is mounted on a motor support block 106 which in turn is mounted on a load cell unit 110 having strain gages 108. The load cell unit 110 is mounted on a rigid cross support 112.

The instrument may be set over a pan 113, FIG. 1, to receive the excess and dumped grain, and grain deflectors 114 are provided on the inside of the apparatus to guide the grain into the pan.

As illustrated in FIG. 1, the infrared testing mechanism 25 includes a vertical tube 120 mounted on a support member 122 and having an upper funnel portion 124 disposed beneath the discharge opening 26 of the grain conduit 24 for directing grain from the conduit 24 into the tube 120. A gate, valve or other discharge mechanism 126 operated by a motor 128 is mounted in the lower portion of the tube 120 for closing the tube 120 to support a column of grain therein. The gate mechanism 126 is adapted to be selectively operated by the motor 128 to discharge the column of grain through a bottom end 130 into the pan 113. Windows 132 and 134 are mounted in opposite sides of the tube 120 just above the gate 126. Near-infrared radiant energy sources or infrared emitting diodes (IRED) 136 together with associated filters 138, Fresnel lens 140 and diffuser 142 are mounted in front of the window 132 for selectively transmitting radiation of different wavelengths through the windows 132 and 134 and the column of grain therebetween. A detector 144 is mounted in front of the window 134 to detect the quantity of transmitted radiant energy. The infrared sources, filters and detector are selected to provide measurement of protein, moisture, or other constituent of the grain, such as in accordance with that described in U.S. Pat. No. 4,286,327 which is incorporated herein by reference, or as is commercially available as Trebor-90 made by Trebor Inc., Gaithersburg, Md.

Figure 5:
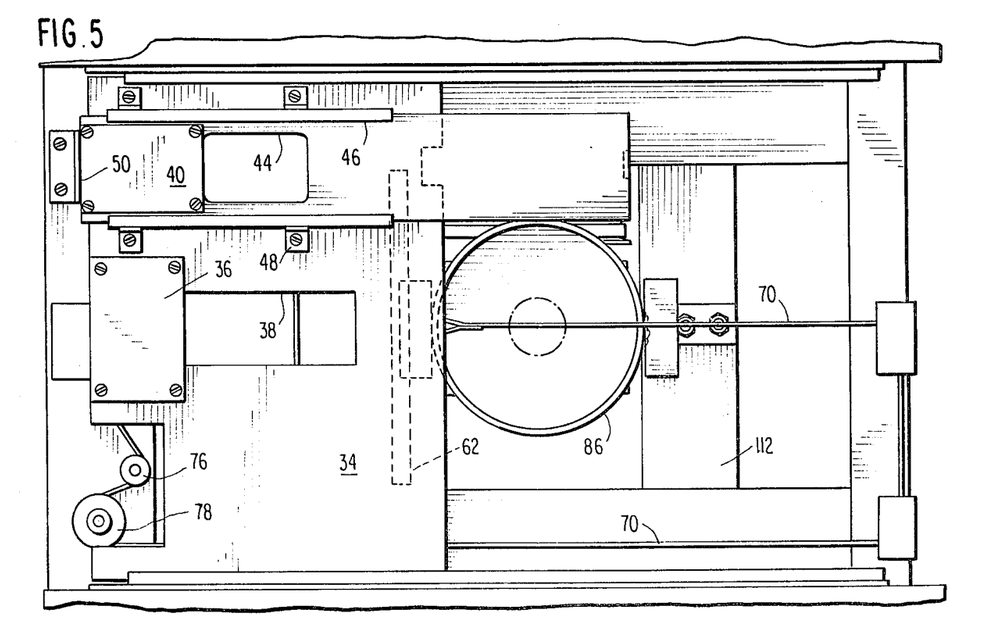
FIG. 5 is a top plan view similar to FIG. 2 showing the components in another position for another stage of the operation.
Figure 7:
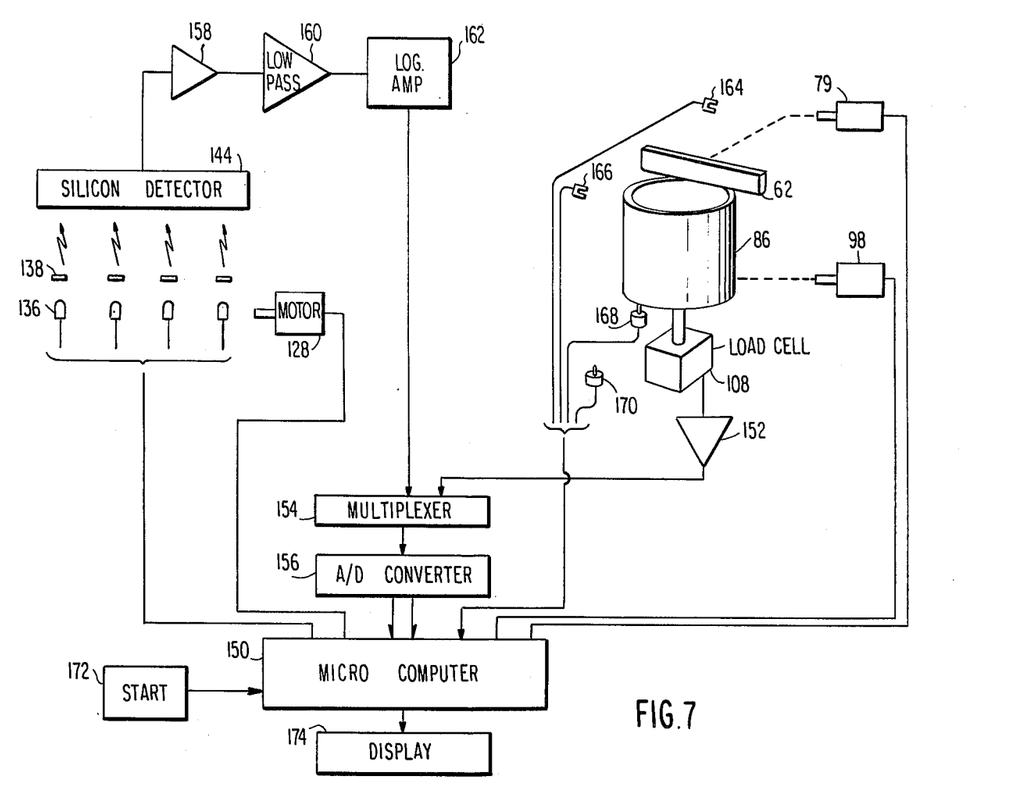
FIG. 7 is a schematic circuit diagram of an electrical circuit for operating the apparatus of FIG. 1.

A circuit for controlling automatic operation of the apparatus, as shown in FIG. 7, includes a microcomputer 150 selectively controlling the stroker motor 79, the kettle dump motor 98, the infrared tester discharge motor 128, and the individual infrared sources 136. The output of the load cell 108 is applied through a low noise amplifier 152, a multiplexer 154 and an analog-to-digital converter 156 to inputs of the microcomputer 150, and the output of the infrared detector 144 is applied through an amplifier 158, a low pass amplifier 160, a logarithmic amplifier 162, the multiplexer 154 and the analog-to-digital converter 156 to inputs of the microcomputer 156. Slide position sensors 164 and 166 sensing the retracted and advanced positions, respectively, of the slide plate 34, FIGS. 4 and 5, and kettle position sensors 168 and 170 sensing the upright and fully tilted positions, respectively, of the kettle 86, FIGS. 1 and 6, are suitably connected to other respective inputs of the microcomputer 150. There are also provided a start switch 172 for initiating a cycle of the microcomputer 156 and a display 174 for displaying the weight of the grain in the kettle 86 and for displaying the protein content and/or moisture content derived from the infrared testing mechanism 25. As an example of one suitable control circuit, the microcomputer 150 is a conventional system employing a type 8085 microprocessor, the load cell 108 is a Revere 600696-04, the amplifier 152 is a Burr-Brown OPA101, the multiplexer 154 is a Harris 5051, the analog-to-digital converter 156 is a Analog Devices AD574KD, the infrared emitting diodes 136 are RCA SG1010A, the detector 144 is a United Detector Technology P/N4584A, the amplifier 158 is a conventional low lever amplifier combination CR043, U401 and uA741, the logrithmic amplifier 162 is a Intersil 8048CCPE, and the display is a Fairchild FND 560; the circuitry for the infrared sensing is similar to that employed in the commercially available Trebor 90. Limit switches 164, 166, 168 and 170 may be mechanical-type switches or optical-type switches. Conventional interfacing, connecting and power circuits are employed. The program for operating the microcomputer 150 is designed to produce the following operation of the apparatus.

The operation is similar in manipulative steps to that described in USDA Circular 921. However it is automatic, much faster and does not need skilled operators.

More specifically with the kettle 86 and tube 120 empty, a test sample of grain preferably 1⅛ quarts or more is dumped into hopper 16 by an unskilled operator and the start button 172 is pushed to start the cycling of the microcomputer 150 through its program. Initially the output of the load cell 108 is read to tare the empty weight on the load cell. Also the IREDs 138 are sequentially operated and initial readings taken from the detector 144 to produce standards or reference values. Then the motor 79 is operated driving capstan 78 and drive tape 70 to cause the slide assembly 28 to move from the position shown in FIGS. 1 and 2 to the position shown in FIG. 5. During the first part of this movement the hopper bottom 20 is uncovered when the stopper pad 36 moves to the left as shown in FIG. 1 allowing the contents of the hopper to flow into and overflow the quart kettle 86. The grain falls through the fill slot 38 during the movement of the slide assembly from the right to the left as shown in FIGS. 1 and 2. At the same time stopper pad 40 moves out from under the end of conduit 26 and cutout fill slot 44 moves under the end of conduit 26 allowing the contents of conduit 24 to empty themselves into fill hopper 124 of the near infrared measuring instrument.

Further movement of the slide assembly 28 to the left as shown in FIG. 1 causes the stroker bar 62 to move up on ramp 90 against the bias of spring 66 and then move across the smooth surface 88 at the top of the test kettle 86 to stroke the kettle. This levels the grain across the top of the kettle. After the stroker bar and the slide assembly has moved all the way to the left to the FIG. 5 position a limit switch 166 is operated. After sensing operation of the limit switch 166, the motor 79 is stopped and readings are taken of the load cell 108, and the IREDs 136 are sequentially operated and readings are taken of the resulting infrared radiation transmitted through the column of grain in the tube 120 to the detector 144. From these readings and the previously read initial readings, the microcomputer 150 calculates the weight per bushel, protein content, and moisture content of the grain being tested. These values are displayed on the display 174. The load cell 108 is found to be quite accurate even after taring the weight of the kettle and the motor and drive for tilting the kettle.

After the values are displayed, the kettle 86 is dumped by motor 98 being automatically started to drive belt 102 rotating axle 96 to tilt the kettle 86 from the position shown in FIG. 1 to the position shown in FIG. 6 to completely dump the contents of the kettle into the tray 113. On reaching the limits of the kettle travel, limit switch 170 is operated, and the motor 98 is automatically reversed to bring the empty kettle back to its original position where limit switch 168 is sensed to stop the motor. The motor 128 and discharge device 126 are operated to discharge the grain from the tube 120.

The motor 79 and its capstan 78 are reversed to cause the slide assembly to return to its original position. During this reverse reciprocation the stroker bar 86 rides on the opposite ramp 90 across the top 88 of kettle 86 in the opposite direction and then returns to its original position where the sensing of limit switch 164 causes the stopping of the motor 79. This movement also positions stopper pads 36 and 40 beneath the hopper bottom 20 and instrument fill conduit end 26. At this time the apparatus is ready to receive and test the next test batch of grain.

The instrument has been tested for accuracy and its variations are no greater than the variations using the USDA test as set forth in Circular 921 at page 6. While the accuracy is directly comparable to the USDA test, the instrument of this invention is much quicker and uses much less time of an operator who need not be skilled. Further, the test weight per bushel can be taken at the same time that the same batch of grain is tested for moisture, protein, oil or other constituents using the integral near infrared testing apparatus.

Figure 8:
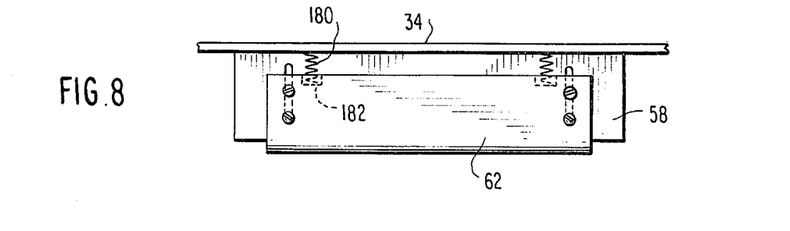
FIG. 8 is an end elevation view of a broken away portion showing a modified stroker mounting arrangement.

In a modification illustrated in FIG. 8, the tension springs 66 and plates 68 of FIG. 3 are replaced by compression springs 180 interposed between the strokes bar 62 and the slide plate 34. The springs are retained within openings 182 in the bar 62 adjacent end portions of the bar.

Since many modifications, variations and changes in detail may be made in the embodiment described above, it is intended that all matter in the foregoing description and shown in the accompanying drawings be interpreted as illustrative and not in a limiting sense.

I claim:

1. Apparatus for automatically providing test weight per bushel of grain, comprising:
   (a) a supporting structure and housing,
   (b) a test kettle having a smooth open top and being selected to receive a predetermined quantity of grain,
   (c) means including weighing means supporting the test kettle in the supporting structure and housing,
   (d) a filling hopper fixedly attached to the supporting structure and housing and having a bottom discharge opening spaced above the test kettle, the hopper having a capacity greater than the predetermined quantity of grain,
   (e) movable means for selectively closing and opening the bottom opening of the filling hopper,
   (f) a stroker movably mounted for vertical movement with its lower stroking edge slightly below the top of the test kettle,
   (g) means for moving the stroker horizontally across the top of the test kettle, and
   (h) a conduit for diverting a portion of the grain in the filling hopper, means closing and selectively opening an outlet end of the conduit, column means positioned within the housing and having an upper hopper below the outlet end of the conduit for receiving the diverted grain portion, and a near infrared instrument capable of measuring moisture, protein or other property of grain.

2. Apparatus for automatically providing test weight per bushel of grain, comprising:
   (a) a supporting structure and housing,
   (b) a test kettle having a smooth open top and being selected to receive a predetermined quantity of grain,
   (c) means including weighing means supporting the test kettle in the supporting structure and housing,
   (d) a filling hopper fixedly attached to the supporting structure and housing and having a bottom discharge opening spaced above the test kettle, the hopper having a capacity greater than the predetermined quantity of grain,
   (e) movable means for selectively closing and opening the bottom opening of the filling hopper,
   (f) a stroker movably mounted for vertical movement with its lower stroking edge slightly below the top of the test kettle, the stroker being lightly biased downwardly and the test kettle having a pair of side ramps, one on each side, to guide the stroker onto the top of the test kettle, and (g) means for moving the stroker horizontally across the top of the test kettle.

3. Apparatus for automating the manual test weight per bushel of grain, measurement method of U.S.D.A. Circular 921 wherein a hopper with a stoppered bottom is filled with more than a quart of grain, the stopper is removed and the grain fills a test kettle, the kettle top is stroked with a stroker to remove excess grain and the grain and test kettle are weighed, and the weighed grain is dumped from the test kettle, the apparatus comprising:

(a) slide means mounting the stopper and the stroker on a reciprocating horizontal member so that the stopper unstops the hopper to overfill the test kettle and with further movement of the slide means the stroker strokes and smothers the top of the test kettle, moving in one direction and then in the opposite direction until the stopper assumes its original stopping location, (b) means mounting the test kettle on a pivotal axis for dumping, (c) drive means for dumping the test kettle, (d) load cell means for weighing the test kettle, test kettle mounting means and drive means for dumping the test kettle 4. Apparatus as in claim 3 further comprising control means for automatically operating in sequence the operations of unstopping the hopper and stroking the test kettle, reading the load cell, and dumping the test kettle.

5. Apparatus as in claim 3 further comprising a near infrared testing instrument in the same housing for testing grain fed from the hopper under control of the slide means.

6. Apparatus as in claim 3 wherein the kettle has a cylindrical shape and a capacity of 67.2 cubic inches with an inside height of four inches, the filling hopper has a capacity of at least 1⅛ quarts of grain with the bottom opening being 1¼ inches in diameter and which is spaced two inches above the top of the kettle.

7. Apparatus for automatically providing test weight per bushel of grain, comprising:

(a) a supporting structure and housing, (b) a test kettle having a smooth open top and being selected to receive a predetermined quantity of grain, (c) means including weighing means supporting the test kettle in the supporting structure and housing, (d) a filling hopper fixedly attached to the supporting structure and housing and having a bottom discharge opening spaced above the test kettle, the hopper having a capacity greater than the predetermined quantity of grain, (e) movable means for selectively closing and opening the bottom opening of the filling hopper, (f) a stroker movably mounted for vertical movement with its lower stroking edge slightly below the top of the test kettle, (g) means for moving the stroker horizontally across the top of the test kettle, the stroker moving means including slide means with a reciprocating horizontal member on which the stroker is movably mounted for vertical movement; and the movable means for opening and closing the bottom opening of the hopper including a stopper mounted on the reciprocating horizontal member; said stroker and said stopper being relatively positioned so that during a first portion of the movement of the reciprocating member the stopper moves to open the bottom opening of the hopper to discharge grain and overfill the test kettle, and during a further portion of movement of the reciprocating member the stroker is moved across the top of the kettle to level the grain.

* * * * *

UNITED STATES PATENT AND TRADEMARK OFFICE
CERTIFICATE OF CORRECTION

PATENT NO. : 4,480,706
DATED : November 6, 1984
INVENTOR(S) : Rosenthal

It is certified that error appears in the above-identified patent and that said Letters Patent is hereby corrected as shown below:

Col. 4, line 35, delete "156" and substitute therefor -- 150 --;
line 43, delete "156" and substitute therefor -- 150 --;
line 56, delete "logrithmic" and substitute therefor -- logarithmic --.
Col. 5, line 60, delete "86" and substitute therefor -- 62 --.
Col. 6, line 13, delete "strokes" and substitute therefor -- stroker --.

Signed and Sealed this

Fourth Day of June 1985

[SEAL]

Attest:

DONALD J. QUIGG

Attesting Officer    Acting Commissioner of Patents and Trademarks